United States Patent
Tait et al.

(10) Patent No.: US 6,753,387 B1
(45) Date of Patent: Jun. 22, 2004

(54) TEMPERATURE CONTROLLING SYSTEM FOR OLEFIN POLYMERIZATION REACTORS

(75) Inventors: John H. Tait, Stafford, TX (US); Rajinder Sharma, Bellaire, TX (US); James E. Hein, Houston, TX (US); Gary A. Marek, Dayton, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 10/392,379

(22) Filed: Mar. 19, 2003

(51) Int. Cl.[7] ................................................. C08F 2/00
(52) U.S. Cl. ........................... 526/59; 526/63; 526/64; 526/348; 526/348.2; 526/348.3; 526/348.4; 526/348.6; 526/348.7; 526/352
(58) Field of Search .............................. 526/59, 63, 64, 526/348, 348.2, 348.3, 348.4, 348.6, 348.7, 352

(56) References Cited

U.S. PATENT DOCUMENTS

| | | | |
|---|---|---|---|
| 1,860,930 A | 5/1932 | Jennings | 417/69 |
| 2,983,488 A | 5/1961 | Thompson | 165/300 |
| 5,296,639 A | 3/1994 | Klug et al. | 562/593 |
| 5,981,671 A | * 11/1999 | Wiemer et al. | 526/64 |
| 6,201,077 B1 | 3/2001 | Bergmeister et al. | 526/104 |
| 6,329,476 B1 | 12/2001 | Martin et al. | 526/64 |

* cited by examiner

Primary Examiner—William Cheung
(74) Attorney, Agent, or Firm—Williams, Morgan & Amerson, P.C.

(57) ABSTRACT

Methods for controlling the temperature of an olefin polymerization reactor (e.g., a polyethylene reactor) system are disclosed herein. The olefin polymerization reactor system includes a polymerization reactor and a cooling jacket in thermal contact with the reactor. An aqueous froth is present in the jacket, and the pressure therein is maintained below atmospheric pressure. Control of the pressure in the jacket controls the boiling temperature of the jacket fluid, and thus, controls the rate of heat transfer from the reactor to the fluid in the jacket. This provides an efficient and simple means for controlling the reactor temperature.

23 Claims, 1 Drawing Sheet

TEMPERATURE CONTROLLING SYSTEM FOR OLEFIN POLYMERIZATION REACTORS

BACKGROUND OF THE INVENTION

1. Field of the Invention

The present invention relates generally to systems for producing polyolefins. More particularly, it concerns a system for controlling the temperature of an olefin polymerization reactor.

2. Description of Related Art

Olefins, particularly alpha-olefins, also referred to as 1-olefins, have several uses. For example, alpha-olefins are used in polymerization processes, either as monomers or comonomers, to prepare polyolefins. Many commercial methods are available to produce olefin polymers, such as polyethylene. One of the most economical routes for making commercial grades of olefin polymers is a loop/slurry process. In a loop/slurry process, the reactor contains a slurry that includes solid catalyst, polymer and liquid monomers. The slurry is circulated in a loop, with some product being removed from the loop periodically or continuously.

The temperature at which the polymerization is carried out is important in determining the molecular weight of the polymer produced, and in preventing the polymer from swelling, which can cause fouling of the polymerization reactor. Furthermore, if a diluent (e.g., paraffin) is used in the loop/slurry process, the polymerization process can be carried out at a temperature low enough that the resulting polymer is largely insoluble in the diluent, simplifying the recovery process.

SUMMARY OF THE INVENTION

Methods of the present invention are directed to controlling the temperature of an olefin polymerization reactor system. The olefin polymerization reactor system comprises a polymerization reactor and a cooling jacket that is in thermal contact with the reactor. In certain embodiments the olefin polymerization reactor is used to polymerize ethylene to produce a homopolymer, or to polymerize ethylene and at least one other alpha-olefin to produce a copolymer. In some embodiments the at least one other alpha-olefin comprises from four to twelve carbon atoms. In certain embodiments the olefin polymerization reactor is a loop reactor, especially a loop/slurry reactor. Methods of the present invention can be directed to controlling the temperature of (e.g., removing heat from) any known loop reactor.

In some embodiments aqueous froth is supplied to the cooling jacket, and in other embodiments a downflow aqueous solution can be supplied to the cooling jacket. The aqueous froth can be supplied to the cooling jacket as a downflow in certain embodiments. In certain embodiments the aqueous froth is supplied to the cooling jacket as an upflow. In certain embodiments the aqueous froth as it is supplied to the cooling jacket comprises between about 95% to 99% by weight liquid, and in some cases between about 97% and 99% by weight liquid. The pressure in the jacket is lower than atmospheric pressure, and heat is transferred from the reactor to the jacket, causing at least some of the water in the aqueous froth or downflow aqueous solution to vaporize, forming a vapor phase and a first liquid phase. The vapor phase and the first liquid phase are separated at a pressure that is lower than atmospheric pressure, and at least a fraction of the vapor phase is condensed to form a second liquid phase at a pressure that is lower than atmospheric pressure. A vacuum pump can be used to maintain the pressure in the system at a level that is lower than atmospheric pressure. The precise pressure in the system can be adjusted so as to maintain a desired temperature in the reactor.

In certain embodiments, the second liquid phase and the first liquid phase are combined to produce a collected recycle water stream, which can be recycled to the jacket. In certain embodiments, before the collected recycle water stream is recycled to the jacket it can be superheated to between 10 and 15 degrees Fahrenheit over the temperature at which the collected recycle water stream boils when at the pressure present in the cooling jacket.

Certain embodiments of the present invention are directed to a method for controlling the temperature of an olefin polymerization reactor system that includes a polymerization reactor, and a cooling jacket in thermal contact with the reactor. At least one alpha-olefin having from two to twelve carbon atoms can be polymerized in the reactor. The at least one alpha-olefin can consist of ethylene or ethylene and, for example, 1-butene, 1-hexene, or 1-octene. An aqueous froth is supplied to the cooling jacket. The pressure in the jacket can be lower than atmospheric pressure, and the heat transferred from the reactor to the jacket causes at least some of the water in the aqueous froth to vaporize, thereby forming a vapor phase and a first liquid phase. The vapor phase and the first liquid phase can be separated at a pressure that is lower than atmospheric pressure. At least a fraction of the vapor phase can be condensed to form a second liquid phase at a pressure that is lower than atmospheric pressure. The pressure in the system can be maintained by a vacuum pump, and the pressure in the jacket can be adjusted so as to maintain a desired temperature in the reactor. The second liquid phase and the first liquid phase can be combined, thereby producing a collected recycle water stream. The collected recycle water stream can be superheated to between 10 and 15 degrees Fahrenheit over the temperature at which the collected recycle water stream boils when at cooling jacket pressure. The collected recycle water stream can be recycled to the jacket.

Certain embodiments of the present invention can permit improved reactor temperature control. Certain reactor temperature control methods of the present invention can result in lower capital costs than methods known in the art. In certain embodiments of the present invention the reactor can have an improved heat transfer coefficient relative to known reactor cooling schemes that employ single liquid phase cooling.

BRIEF DESCRIPTION OF THE DRAWINGS

The following drawing forms part of the present specification and is included to further demonstrate certain aspects of the present invention. The invention can be better understood by reference to this drawing in combination with the detailed description of specific embodiments presented herein.

DESCRIPTION OF ILLUSTRATIVE EMBODIMENTS

Figure 1:
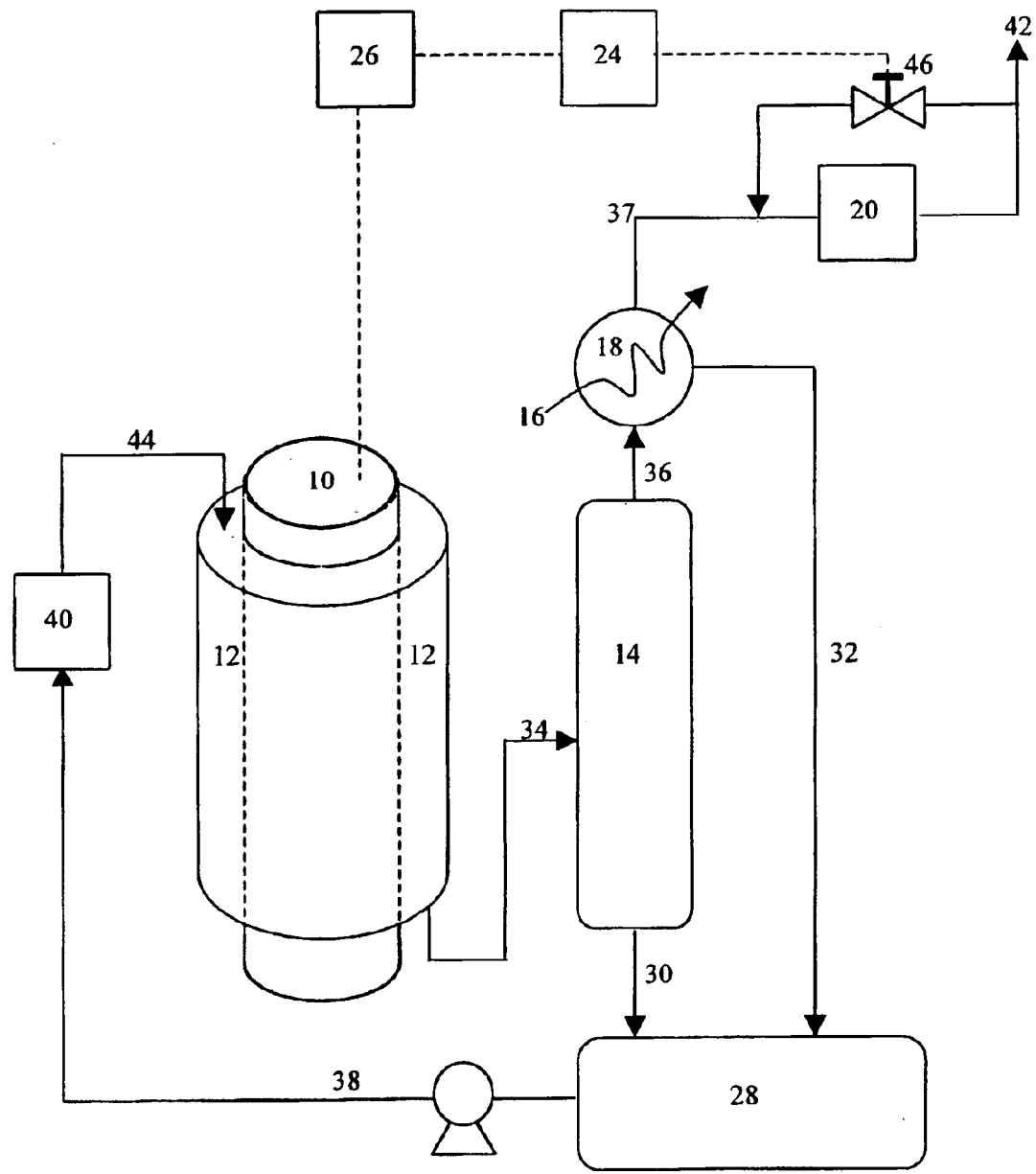
FIG. 1 depicts a scheme for controlling the temperature of an olefin polymerization reactor.

One embodiment of the present invention is shown in FIG. 1. Olefin polymerization takes place in a reactor 10. In some embodiments the olefin polymerized in the reactor comprises at least one alpha-olefin, and the polymerization in the reactor 10 produces a homopolymner of ethylene or a copolymer of ethylene and at least one other alpha-olefin. In certain embodiments the at least one other alpha-olefin (e.g., comonomer) has from two to twelve carbon atoms (e.g., 1-butene, 1-hexene, 1-octene, and mixtures thereof). The polymerization in the reactor 10 can be carried out in other manners known in the art, such as solution, or slurry polymerization. Any reactor type that is suitable for olefin polymerization can be used in the present invention. A stirred reactor can be utilized for a batch process, or the reaction can be carried out continuously in a loop reactor. The reactor 10 can, in certain embodiments be a loop reactor. In certain embodiments the polymerization is conducted in a loop reactor under slurry polymerization conditions. Alternatively a plurality of stirred reactors either in series, parallel or combinations thereof can be used for polymerizing olefins, and the reaction conditions can be different in the different reactors. The olefin is polymerized in the reactor 10 using methods known in the art, which will typically involve catalysts (e.g., supported Ziegler-Natta catalysts, organozirconium catalysts, organo-hafnium catalysts, and chromium on silica catalysts, among others). The polymerization can, in certain embodiments, comprise reacting the olefin in a diluent, such as paraffin, among others.

Olefin polymerization reactions of the present invention are typically exothermic. In certain embodiments the temperature in the reactor 10 is kept below the temperature at which polymer swells and fouls the reactor 10, but high enough to permit polymerization. In certain embodiments in which a diluent is used in the polymerization reaction, the temperature can, in some embodiments, be low enough to cause the polymer product to be insoluble in the diluent, but still high enough to permit polymerization. Reaction temperature can also affect the degree of polymerization, and thus, controlling the temperature of the reaction will affect the molecular weight of the polymer product. A relatively high reactor temperature will produce a polymer with a lower molecular weight. A low reactor temperature can be difficult to maintain due to the exothermic nature of the polymerization reaction. Furthermore, at low temperatures the flashing off of a reactor diluent can be difficult, and can produce a polymer with a commercially unacceptable molecular weight.

In some embodiments the polymerization is conducted at a temperature from about 150° F. to about 230° F., in certain embodiments between about 170° F. and 225° F., and in some embodiments between about 195° F. and 220° F. In certain embodiments, when the polymerization is carried out at temperatures below about 150° F. the efficiency of the catalyst and the reactor 10 can be adversely affected, and when the polymerization is carried out at temperatures above about 230° F., the reactor can foul due to the swelling of the polymer.

The temperature at which an olefin polymerization reaction is carried out can also depend on the type of catalyst that is used in the reaction. For example, polymerization reaction temperatures with a Ziegler-Natta catalyst system can, in certain embodiments, be kept between about 190° F. and 210° F. Polymerization reaction temperatures with a zirconium- or hafnium-containing catalyst system can, in some embodiments, be between about 158° F. and 212° F. Polymerization reaction temperature with chromium on silica catalysts can, in certain embodiments, be between about 190° F. and 225° F.

The polymerization reactor 10 is in thermal contact with the cooling jacket 12. For example, the cooling jacket 12 can surround the outside of the polymerization reactor 10, or the cooling jacket 12 can comprise pipes that run through the interior of the polymerization reactor 10. As an aqueous froth or a downflow aqueous solution 44 enters the jacket 12, below-atmospheric pressure in the jacket causes some vaporization of the water, and thus the cooling jacket 12 contains an aqueous froth. Heat from the polymerization reaction is transferred to the cooling jacket 12, causing at least some of the water in the aqueous froth to evaporate, forming a vapor phase and a first liquid phase. A combined stream 34 comprising the vapor phase and the first liquid phase is carried to a vapor/liquid separator 14. The term "water" as used herein refers to liquids that consist essentially of water. In certain embodiments, the water can comprise small amounts (e.g., less than about 5 wt %) of additives, such as scale inhibitors, or other compounds. The vapor phase and the first liquid phase are separated in the vapor/liquid separator 14. The vapor phase is removed in an overhead stream 36 and the first liquid phase is removed in a bottoms stream 30. The vapor phase 36 is cooled in a condenser 18, thereby forming a second liquid phase 32. Cooling water or cooling air 16 is used in condensing the vapor phase 36. The second liquid phase 32 is combined with the first liquid phase 30 a condensate drum 28.

A vacuum pump 20 is used to keep the pressure in the cooling system below atmospheric pressure. The vacuum pump 20 is located in the conduit that carries the remaining vapor phase 37 that exits the condenser 18. The extent of the vacuum in the system, relative to atmospheric pressure, is controlled by opening or closing a recycle valve 46, which controls the flow rate of vapor recycled from the outlet of the vacuum pump 20 to its inlet. Any portion of the vapor phase that is not recycled can be released to the atmosphere in a vent stream 42.

Thus, the water is evaporated at less than atmospheric pressure in the jacket 12, the vapor phase 36 is separated from the first liquid phase 30 under less than atmospheric pressure, and the vapor phase 36 is condensed to the second liquid phase 32 under less than atmospheric pressure. A temperature controller 26 senses the temperature in the reactor 10 and compares that temperature to a pre-set target temperature. Based on this comparison of actual and target reactor temperatures, a signal is sent to a pressure controller 24, which adjusts the pressure control valve 46. When the temperature in the reactor 10 is higher than the target, and therefore needs to be reduced, the valve 46 is closed entirely or partially. As a consequence, the pressure in the cooling jacket 12 is lowered, more heat is removed from the reactor as water in the aqueous froth in the jacket is more readily evaporated, and the temperature in the reactor 10 decreases. As vacuum pressure in the cooling jacket 12 is lowered, water boils at a lower temperature, which causes a larger temperature difference between the reactor 10 temperature and the water boiling temperature resulting in more cooling.

When the temperature of the reactor 10 needs to be increased, the valve 46 is at least partially opened, causing greater recycle of vapor to the inlet of the vacuum pump 20, and at least some of the withdrawn vapor is recirculated in a loop to the vacuum pump 20. Thus, with less vapor removal from the jacket, the pressure in the cooling jacket 12 is increased although it is still below atmospheric pressure, and water (e.g., with the aqueous froth) in the jacket boils at a hotter temperature, which decreases the temperature difference between the reactor 10 and water in the boiling jacket. This, results in a decrease in heat removal from the reactor 10 and an increase in reactor temperature.

The first liquid phase 30 and the second liquid phase 32 are combined in a condensate drum 28 to produce a collected recycle water stream 38, which is pumped through a heater 40. The collected recycle water stream 38 is typically at higher than atmospheric pressure, and is superheated to between about 10 and 15 degrees Fahrenheit over its boiling point at cooling jacket pressure in the heater 40. The degree to which the collected recycle water stream is superheated depends on the amount of vapor that is to be generated in the aqueous froth. The superheated collected recycle water stream 44 is then passed into the cooling jacket 12 where it partially flashes to produce an aqueous froth. In some embodiments, between about 1 and 5 wt % of the collected recycle water stream is vaporized during the flashing step, and in certain embodiments between about 1 and 3 wt %. The inlet into the cooling jacket 12 for the superheated collected recycle water stream 44 can be at the top of the jacket 12, permitting a down flow of the aqueous froth. Superheating of the collected recycle water stream can be optional in embodiments in which there is a downflow of the aqueous froth. Alternatively, the superheated collected recycle water stream 42 can be introduced into the jacket 12 with an up flow of the aqueous froth. While the froth resides in the jacket, heat transferred from the reactor into the jacket will cause additional vaporization of water, thus increasing the mass ratio of vapor to liquid.

All of the disclosed and claimed herein can be made and executed without undue experimentation in light of the present disclosure. It will be apparent to those of skill in the art that variations may be applied to the methods and in the steps or in the sequence of steps of the method described herein without departing from the concept, spirit and scope of the invention. All substitutes and modifications apparent to those skilled in the art are deemed to be within the spirit, scope and concept of the invention as defined by the appended claims.

What is claimed is:

1. A method for controlling the temperature of an olefin polymerization reactor system that includes a polymerization reactor and a cooling jacket in thermal contact with the reactor, comprising:
   (a) supplying an aqueous froth to the cooling jacket, wherein the pressure in the jacket is lower than atmospheric pressure, and wherein heat transferred from the reactor to the jacket causes at least some of the water in the aqueous froth to vaporize, thereby forming a vapor phase and a first liquid phase,
   (b) separating the vapor phase and the first liquid phase at a pressure that is lower than atmospheric pressure, and
   (c) condensing at least a fraction of the vapor phase to form a second liquid phase at a pressure that is lower than atmospheric pressure.

2. The method of claim 1, further comprising:
   combining the second liquid phase and the first liquid phase, thereby producing a collected recycle water stream, and recycling the collected recycle water stream to the jacket.

3. The method of claim 2, wherein the collected recycle water stream is superheated to between 10 and 15 degrees Fahrenheit over the temperature at which the collected recycle water stream boils when at cooling jacket pressure.

4. The method of claim 1, wherein a vacuum pump is used to maintain a pressure less than atmospheric pressure in steps (a), (b), and (c).

5. The method of claim 2, wherein the pressure in the jacket is adjusted so as to maintain a desired temperature in the reactor.

6. The method of claim 1, wherein ethylene is polymerized in the reactor to produce polyethylene.

7. The method of claim 1, wherein ethylene and at least one other alpha-olefin are co-polymerized in the reactor.

8. The method of claim 7, wherein the at least one other alpha-olefin comprises from four to twelve carbon atoms.

9. The method of claim 1, wherein the reactor is a loop reactor.

10. The method of claim 1, wherein the aqueous froth that is supplied to the jacket comprises between about 95% to 99% by weight liquid.

11. The method of claim 10, wherein the aqueous froth that is supplied to the jacket comprises between about 97% to 99% by weight liquid.

12. The method of claim 1, wherein the aqueous froth is supplied to the cooling jacket as a downflow.

13. The method of claim 1, wherein the aqueous froth is supplied to the cooling jacket as an upflow.

14. A method for controlling the temperature of an olefin polymerization reactor system that includes a polymerization reactor and a cooling jacket in thermal contact with the reactor, comprising:
   (i) supplying a downflow aqueous solution to the cooling jacket, wherein the pressure in the jacket is lower than atmospheric pressure, and wherein heat transferred from the reactor to the jacket causes at least some of the water in the aqueous solution to vaporize, thereby forming a vapor phase and a first liquid phase,
   (ii) separating the vapor phase and the first liquid phase at a pressure that is lower than atmospheric pressure, and
   (iii) condensing at least a fraction of the vapor phase to form a second liquid phase at a pressure that is lower than atmospheric pressure.

15. The method of claim 14, further comprising:
   combining the second liquid phase and the first liquid phase, thereby producing a collected recycle water stream, and recycling the collected recycle water stream to the jacket.

16. The method of claim 15, wherein the collected recycle water stream is superheated to between 10 and 15 degrees Fahrenheit over the temperature at which the collected recycle water stream boils when at cooling jacket pressure.

17. The method of claim 14, wherein a vacuum pump is used to maintain a pressure less than atmospheric pressure in steps (a), (b), and (c).

18. The method of claim 15, wherein the pressure in the jacket is adjusted so as to maintain a desired temperature in the reactor.

19. The method of claim 14, wherein ethylene is polymerized in the reactor to produce polyethylene.

20. The method of claim 14, wherein ethylene and at least one other alpha-olefin are co-polymerized in the reactor.

21. The method of claim 20, wherein the at least one other alpha-olefin comprises from four to twelve carbon atoms.

22. The method of claim 14, wherein the reactor is a loop reactor.

23. A method for controlling the temperature of an olefin polymerization reactor system that includes a polymerization reactor, and a cooling jacket in thermal contact with the reactor, wherein at least one alpha-olefin having from two to twelve carbon atoms is polymerized in the reactor, comprising:
   (A) supplying an aqueous froth to the cooling jacket, wherein the pressure in the jacket is lower than atmospheric pressure, and wherein heat transferred from the reactor to the jacket causes at least some of the water in the aqueous froth to vaporize, thereby forming a vapor phase and a first liquid phase, (B) separating the vapor phase and the first liquid phase at a pressure that is lower than atmospheric pressure, (C) condensing at least a fraction of the vapor phase to form a second liquid phase at a pressure that is lower than atmospheric pressure, wherein a vacuum pump is used to maintain a pressure less than atmospheric pressure in steps (A), (B), and (C), and the pressure in the jacket is adjusted so as to maintain a desired temperature in the reactor, (D) combining the second liquid phase and the first liquid phase, thereby producing a collected recycle water stream, (E) superheating the collected recycle water stream to between 10 and 15 degrees Fahrenheit over the temperature at which the collected recycle water stream boils when at cooling jacket pressure, and (F) recycling the collected recycle water stream to the jacket.

* * * * *